(12) United States Patent
Monson et al.

(10) Patent No.: US 6,578,813 B1
(45) Date of Patent: *Jun. 17, 2003

(54) SHOCK ISOLATED WORKSPACE

(75) Inventors: Robert J. Monson, St. Paul, MN (US); Scott J. Benjamin, Lakeville, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/575,253

(22) Filed: May 22, 2000

Related U.S. Application Data

(63) Continuation-in-part of application No. 09/490,680, filed on Jan. 24, 2000.

(51) Int. Cl.$^7$ .............................................. F16M 13/00
(52) U.S. Cl. ...................................................... 248/618
(58) Field of Search ................................ 248/618, 620, 248/638, 346.01, 621

(56) References Cited

U.S. PATENT DOCUMENTS

| 4,768,028 | A | * | 8/1988 | Blackie ........................ 340/705 |
| 5,277,584 | A | * | 1/1994 | DeGroat et al. ............... 434/29 |
| 5,765,797 | A | * | 6/1998 | Greene et al. ............... 248/398 |
| 6,300,946 | B1 | * | 10/2001 | Lincke et al. ................ 345/326 |

* cited by examiner

Primary Examiner—Leslie A. Braun
Assistant Examiner—A. Joseph Wujciak, III
(74) Attorney, Agent, or Firm—Patrick M. Hogan; Glenn W. Bowen

(57) ABSTRACT

An improved shock isolation system having an operator platform wherein an operator chair is interposed as a physical barrier between the operator's graphic terminal and the processing equipment that controls the graphic terminal so that the processing equipment is maintained in a normally non-operator contactable position by interpositioning an operator's chair therebetween thereby minimizing the opportunity of the operator being injured by being accidentally thrown in to the processing equipment.

17 Claims, 4 Drawing Sheets

SHOCK ISOLATED WORKSPACE

CROSS REFERENCE TO RELATED PATENT APPLICATIONS

This application is a continuation-in-part of U.S. patent application title USER COUPLED WORKSPACE SHOCK ISOLATION SYSTEM, Ser. No. 09/490,680 filed Jan. 24, 2000.

FIELD OF THE INVENTION

This invention relates generally to a shock isolation system and, more particularly, to an improved shock isolation system that interposes an operator chair between the graphic terminal and the processor equipment to isolate the operator from the processor equipment to thereby minimize an operator being injured by the processor equipment in the event of a significant shock to the system.

BACKGROUND OF THE INVENTION

The copending application titled USER COUPLED WORKSPACE SHOCK ISOLATION SYSTEM, Ser. No. 09/490,680 filed Jan. 24, 2000 shows and describes a shock isolation system that isolates a deck platform from a ship by forming a unitary isolation platform which simultaneously supports both the operator station and the operator's console. The isolation platform generally includes a unitary work deck, which is considerably less massive than the ship, so that the isolation platform can be supported from the deck by conventional vibration and shock absorbers. Consequently, the effect of explosive impacts on the deck can be simultaneously isolated from both the operator station and the operator console to thereby minimize the chance of injury or death to the operator from displacement of the equipment relative to the operator.

The present invention comprises an improvement to the isolation platform to further minimize injury to an operator. The chances of injury to an operator are further minimized by interpositioning an operator chair between the graphic terminal and the heavier processing equipment such as the graphic terminal processor and power supplies. Placing the processing equipment in a non-operator contactable position, for example, on the backside or underside of the operator chair ensures that the operator chair and its support will prevent accidental operator contact with the processing equipment during a significant shock to the system. By positioning the processing equipment in a non-operator contactable condition and positioning only the graphic terminal and controls frontally of the operator reduces the chances of operator injury due to contact with processing equipment since the graphic terminal can be made to breakaway if impacted. In addition, the positioning of the processing equipment apart from the graphic terminal provides for easier servicing of the processing equipment It is envisioned that the server is located remote from the deck platform thereby minimizing the weight on the deck platform. Consequently, the deck platform including equipment thereon can be made of a sufficiently smaller mass so that in most instances the mass of the operator is greater than the mass of the deck platform and the equipment thereon.

DESCRIPTION OF THE PRIOR ART

U.S. Pat. No. 4,128,217 shows a type of small vehicle isolation system that isolates the crew seat for an aircraft. The crew seat is mounted directly to the body of the aircraft, with a set of rails being capable of distorting up to 10 degrees during an impact.

U.S. Pat. No. 4,392,546 shows a system to prevent an operator from the effects of undue motions as the tractor travels over uneven terrain by having an operator station for a tractor cab with the console and the operator mounted on a platform that is coupled to the frame of the tractor.

U.S. Pat. No. 4,892,051 shows a conventional shock-isolation method and apparatus for a large ship mounted device with a shock isolation apparatus mounted between the fire-control system and the deck of the ship.

U.S. Pat. No. 4,987,320 discloses a spring shock system for use in a marine vessel.

U.S. Pat. No. 4,989,684 shows an improved vibration damping and shock absorber for the cab of a truck.

U.S. Pat. No. 5,520,259 shows a vibration-damping and shock-absorbing cabin for construction equipment.

U.S. Pat. No. 5,579,859 discloses springs and shock dampers for supporting a standing surface on a material-handling vehicle.

U.S. Pat. No. Re. 29,123 discloses a tractor with a unitary cab and control console that are vibrationally isolated from the tractor chassis.

SUMMARY OF THE INVENTION

Briefly, the present invention comprises an improved shock isolation system having an operator platform wherein an operator chair is interposed as a physical barrier between the operator's graphic terminal and processing equipment that control the graphic terminal so that the processing equipment is maintained in a normally non-operator contactable position when the operator is in the operator's chair thereby minimizing the opportunity of the operator being injured by being accidentally thrown in to the processing equipment.

DESCRIPTION OF THE PREFERRED EMBODIMENT

Figure 1:
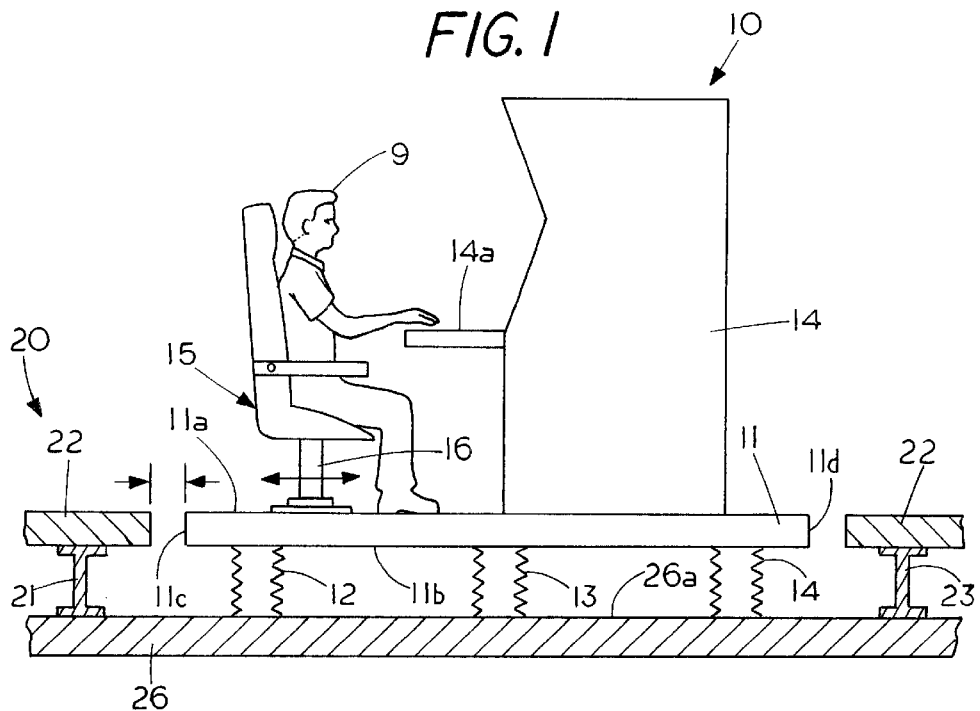
FIG. 1 is a cross-sectional view of a portion of a deck of a ship.
Figure 2:
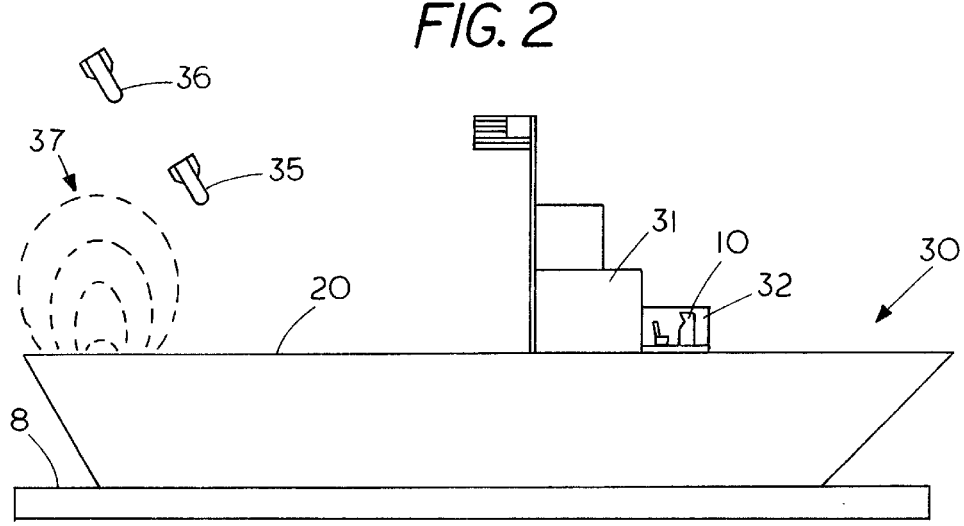
FIG. 2 shows a side view of ship being impacted by explosives.
Figure 3:
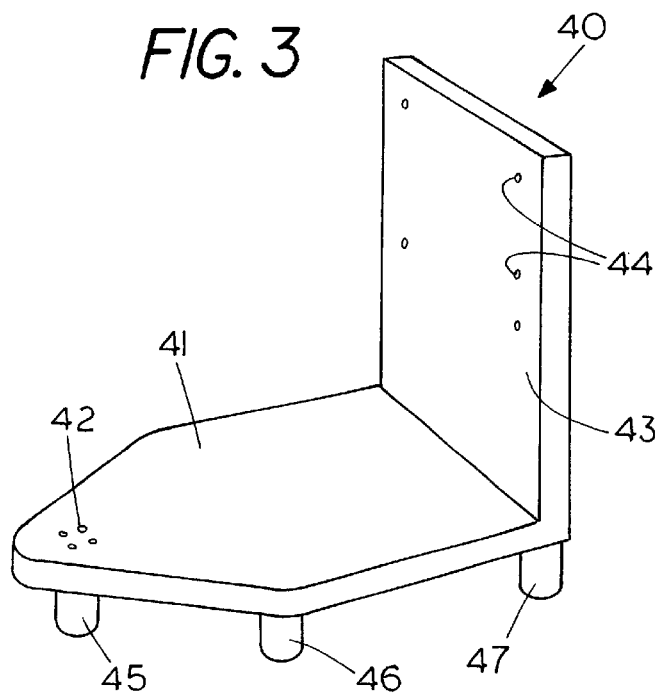
FIG. 3 shows a perspective view of an island platform for vibration and shock isolation mounting
Figure 4:
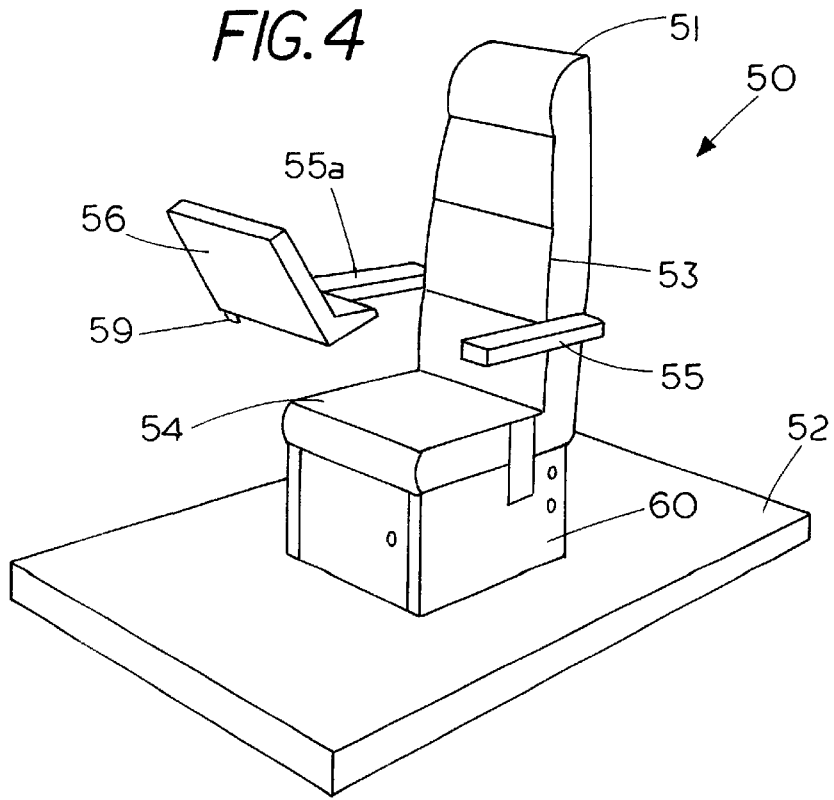
FIG. 4, is a perspective of an island platform with the processing equipment mounted beneath an operator chair.
Figure 5:
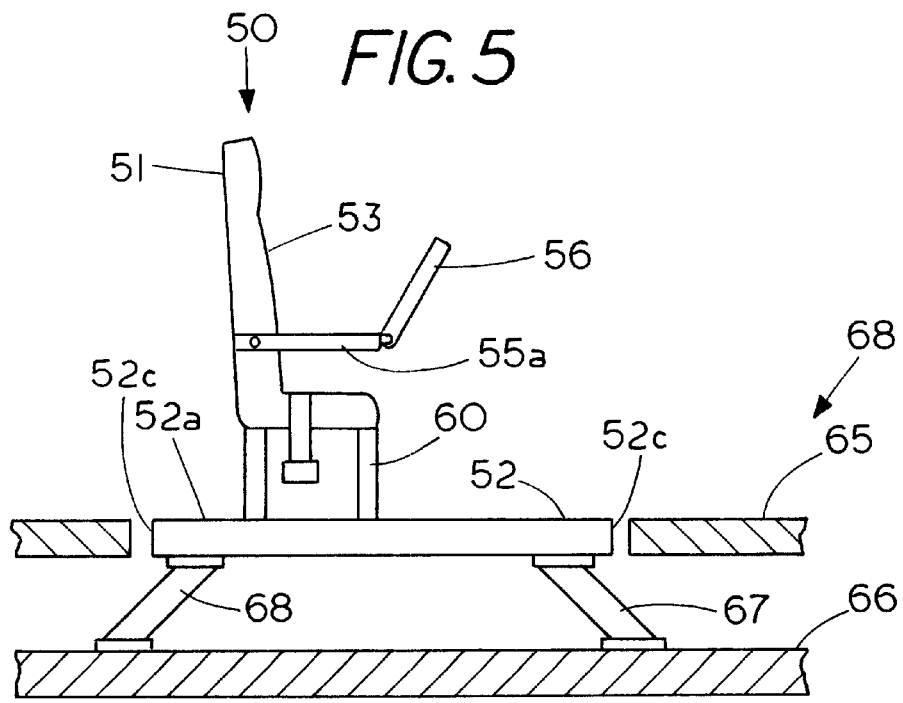
FIG. 5 shows a side view of an island platform and the ship.
Figure 6:
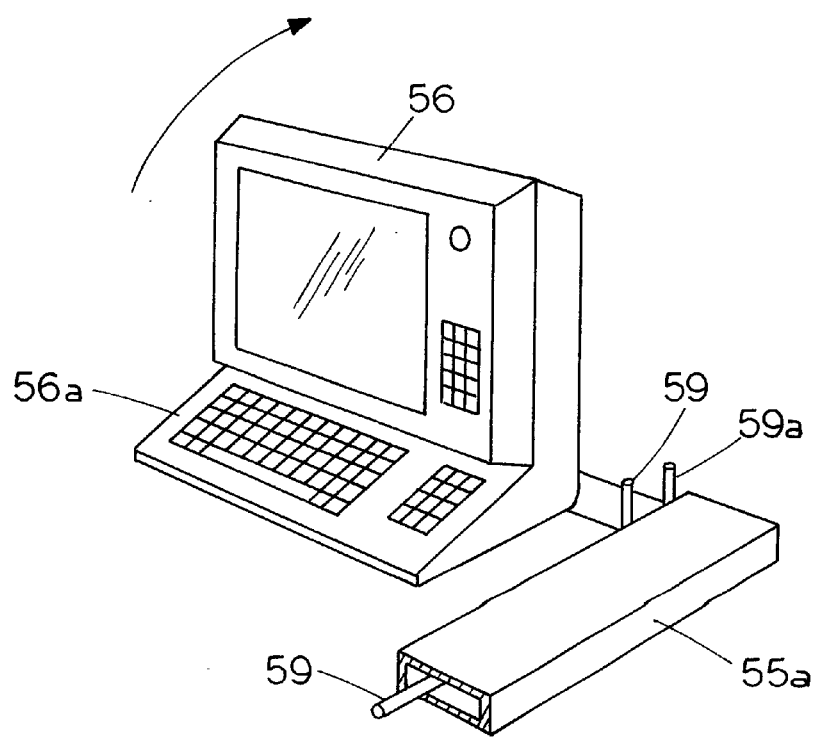
FIG. 6 is a perspective view of a graphic terminal mounted to an armrest of the operators chair.

FIG. 1–3 shows the shock isolation system that simultaneously isolates the platform, the operator, the operator station and the operator's console to thereby minimize operator exposure to shock and vibration, which is described and claimed in the copending U.S. application Ser. No. 09/490,680. The present invention, which comprises an improvement to the shock isolation system of FIGS. 1–3 is shown in FIGS. 4–6. In the improved system the processing equipment is physically isolated from operator contact while only the graphic terminal and keyboard are positioned in an operator viewable condition thus allowing one to build a smaller isolation platform that is more readily suspended by conventional shock mounts.

FIG. 1 shows a cross-sectional view of a portion of a ship deck with a console 14 and a console operator station 15 comprising a chair 16 supported by a unitary rigid deck platform 11 with the deck platform 11 mounted substantially coextensive with deck 10 to provide operator access thereto. Typically, console 14 contains electronic equipment such as monitors, computers and the like which are normally individually isolated from a supporting platform by shock and vibration mounts within the console.

The console chair 16 is secured to the top 11a of platform 11 so as to prevent displacement with respect thereto. Top 11a comprises a foot deck to support either a standing or sitting operator. Similarly, console 14 is secured directly to top 11a of platform 11 so as to prevent displacement with respect thereto. The securing of console 14 and console operator station 15 to the rigid platform 11 prevents relative displacement of the console operator station 15 and the console 14 with respect to each other. By mounting the console operator station 15 proximate console 14, it enables an operator in the console operator station 15 to interact with console 14 while the fixed mounting of the operator station and the console prevents the operator 9 from being impacted by displacement of the console and the operator station relative to one another. Thus, the operator station, the island platform and the console substantially operate as a single dynamic unit, to decrease the chances of injury to an operator thereon as well as to preserve the operability of the computer.

The elimination of the conventional isolated shock and vibration mounts for each piece of electronic equipment not only reduces the chances of injury to an operator but it also provides greater above-deck usable space since the space the consoles normally use for shock mounts is eliminated by use of a single set of shock and vibration mounts to support the operators platform 11.

The operator platform 11 is supported by shock mounts 12, 13 and 14 which isolate high "g" shocks present in ship deck 20. While the isolation of the operator from high "g" shocks using only shock absorbers is known, it should be understood that oftentimes shock absorbers are incorporated with vibration dampers so that both shock and vibration can be inhibited in the same mounting device. Thus, operator platform 11 is usable with either shock supports alone or shock supports that include vibration attenuators or absorbers. If the shock supports are sufficiently responsive in relation to the inertia of the support platform, the support platform can maintain a substantially fixed spatial orientation, which further lessens the opportunity of injury to the operator since the operator will not normally be fixedly secured to the support platform.

Ship deck 20 is shown to comprise a lower frame 26 having a top surface 26a which supports an upper deck 22 through a set of support beams 21, 23. From FIG. 1 it is apparent that one end 11c of platform 11 is spacedly isolated from top deck 22 by an air gap and opposite end lid is spacedly isolated from top deck 22 by an air gap. Similarly, the opposite sides of platform 11 are spacedly isolated from top deck 22 deck 11 by air gaps. The deck 11 therefor comprises a unitary operator island that can move relative to top deck 22 without directly contacting top deck 22. Consequently, the vibration and shock mounts, which support platform 11 on deck 20, reduce shocks and attenuate vibrations so that the island deck platform 11, including the operator 9 receive little of any effect from a high "g" impact on the ship.

FIG. 2 shows a ship 30 of mass $M_1$ floating in a body of substantially incompressible fluid such as water 8. The ship includes a pilot house 31 and an operator room 32 which contains the operator and equipment platform 10 shown in FIG. 1. It will be appreciated that the mass $M_2$ of the operator and equipment platform 10 is many hundred-fold less than the mass $M_1$ of the ship.

Ship 30 is shown receiving impacts from a bomb explosion 37 and about to receive further impacts from explosions of bombs 35 and 36. In conventional systems the mass $M_1$ of the ship is sufficiently large so as to absorb many impacts without disrupting either an operator or an operator control station. However, impacts do occur which do not destroy the ship but are sufficiently great so that the mass of the ship cannot effectively protect the operator or the operator equipment. In order to respond to these type of hits, previous designs taught the construction of consoles that were isolated from the deck 20 by individual vibration and shock mounts. One of the adverse side effects was that the operators who are standing or sitting on the deck might be hit by either the deck or the console or both as the console responds to an impact. Operator platform 11 minimizes operator injury by rigidly coupling the operator control station to the operator console so as to prevent relative movement therebetween. The operator platform 11 provides a four-fold effect: first, the large mass disparity between the ship 30 and the operator platform 11 provides a damping effect on forces transmitted to flame 26; second, the displacement forces on frame 26 are damped by vibration and shock mounts 12, 13 and 14 which serve to attenuate the forces to platform 11; third, if displacement forces are sufficiently large so as not to be effectively diminished by vibration and shock mounts 12, 13 and 14, the coupling of the operator platform 15 to the console with the operator 9 being supported by the platform 11 minimize the chances of injury to the operator 9 due to relative displacement of the equipment with respect to the operator; and fourth, the inertia of the platform and the spaced mounting of the platform 11 from the deck 22 helps maintain the platform in momentarily fixed spatially position so that the operator, who is not fixedly secured to the platform 11, is not thrown into or from the platform.

It will be envisioned that operator safety is enhanced because the inertia of the platform limits the platform and operator movement while the operator, who is now part of the system, tends to move in conjunction with the station components rather than having the components of the station move relative to the platform 11 and the operator 9 which could cause injury to the operator.

In the embodiment shown in FIGS. 1–3, the platform 11 is spaced from the ship frame 26 and solely supported therefrom by a shock mount that includes shock attachments 12, 13 and 14. Typically, the platform is made of metal and for a single operator the unitary platform can have a surface area of 20 to 30 square feet.

FIG. 3 shows a perspective view of an island platform 40 for vibration and shock isolation with platform 40 comprising a foot deck 41 having a mounting member 42 for rigidly securing an operator's platform thereon and a wall 43 having mounting members 44 for mounting electronic equipment thereto. Both the operator platform and the electronic equipment are fixedly mounted thereto without the benefit of vibration or shock absorbers. Attached to the underside of island platform 40 is a shock mount comprising a set of vibration and shock absorbers 45, 46 and 47. The concept of vibration and shock absorbers are known in the art and, in one type, generally comprise some type of spring that will yield in response to a sudden force and some type of shock absorber that absorbs shock and also quickly damp out harmful shocks and vibrations.

The combat shock-isolation system isolates the effects of explosion shocks that could imperil the operation of a ship which is directly supported by a substantially incompressible medium such as a body of water. The ship has a first mass with the ship having a deck thereon. Located thereon is a deck platform having a second mass substantially less than the first mass. The deck platform is spacedly mounted from the deck so as to permit relative displacement between the deck and the ship without contact therebetween. Located on the deck platform is a console which is fixedly mounted on deck platform so as to move with the deck platform. Also located on the deck platform is a console-operator station, which is also fixedly mounted to the deck platform so as to move with the deck platform 11 with the console-operator station mounted proximate the console 14 to enable an operator in the console-operator station 15 to interact with the console. The deck platform 11 is solely supported by a shock mount comprising shock attachments 12, 13 and 14 which is connected to the deck platform and to the ship to support the deck platform 11 so that an explosion shock received by the ship is simultaneously isolated from both the console-operator station and the console by the shock mount supporting the deck platform to thereby prevent the console-operator station and the console to move in relation to each other and thereby minimize injury to the operator thereon.

In a different sense, the shock isolation system utilizes the inherent inertia of the unitary platform 11 to momentarily spatially isolate the unitary platform 11 from the effects of high "g" forces. Further, operator safety is obtained by having an operator station 15 and the console 14 fixedly secured to the unitary platform 11 thereby further inhibiting opportunity for operator injury by simultaneously preventing the operator station and the unitary platform from moving relative to one another.

FIG. 4 shows the improved shock isolation system 50 of the present invention wherein an operator chair 51 for supporting an operator is interposed between a graphic terminal 56 and processing equipment 60 as a physical barrier. That is, operator chair 51 includes a cushioned back rest 53, a seat cushion 54 and cushioned arm rests 55 and 55*a* with graphic terminal 56 mounted to arm rest 55*a*. The operator chair 51 is fixedly secured to isolated deck platform 52 so that operator chair 51 and platform 52 move as a unit. A power cable 59 extends from graphic terminal 56 to processing equipment 60 where the processor and power supply are located. A further cable, (not shown) connects the processing equipment with a remote server. By having the server remote from the deck platform 52 the weight of the deck platform can be reduced thereby enabling in most instances for the mass of the operator on the deck platform being larger than the combined mass of the deck platform 52 and equipment thereon. Thus when the operator sits in chair 51 the chair 51 acts as a physical barrier to prevent contact with the processing equipment and the graphic terminal and controls can be the only equipment located in a position where the operator may accidentally come into contact during a severe shock to the system.

Processing equipment 60 is fixedly secured to platform 52 and also fixedly secured to chair 51 so that chair 51 and platform 52 move as a unit. Consequently, the rigidly mounted processing equipment move as a unit with the platform 52. In operation, the operator sits in chair 51 and views the graphic terminal 56. In the condition shown, the only equipment proximate the operator is graphic terminal 56 and controls thereto which could be touch screen, keyboard or a voice activated system. By positioning the processing equipment 60 below chair 51 ensures that the processing equipment 60 is maintained in a non-operator contactable condition by the chair 51. Positioning only the graphic terminal and controls frontally of the operator reduces the chances of operator injury due to contact with equipment since the graphic terminal can either be positioned far enough from the operator to avoid operator contact or if desired the graphic terminal support 56*a* can be a hinged breakaway support that releases or swings forward out of the operators contact area. Thus the isolation platform 52 minimizes shock injury to the operator by positioning only the graphic terminal 56 and controls frontally of the operator. Consequently, the chances of the operator being injured by a significant shock are further reduced since there is less equipment to impact against.

In addition to the improved operator safety, the positioning of the processing equipment apart from the graphic terminal provides for easier servicing of the processing equipment since the operator chair is positioned as part of the housing for the processing equipment and therefore does not interfere with a user being able to get at and service any equipment under the chair.

FIG. 5 shows a side sectional view of a rigid metal isolation platform 52 mounted to ship deck 68 comprising a top deck 66 and a lower deck 65. Isolation platform 52 has a top surface 52*a* which supports operator chair 53. From FIG. 5 it is apparent that ends 52*c* of platform 52 are spacedly isolated from top deck 22 by air gaps. Similarly, the opposite sides of platform 52 are spacedly isolated from top deck 22 deck 65 by similar air gaps. The deck 52 therefor comprises a unitary operator island that can move relative to top deck 65 without directly contacting top deck 65. The operator chair 53 which is secured to deck 52 is interposed between an operator and the processing equipment 60. The vibration and shock mounts, which support platform 11 on deck 20, reduce shocks and attenuate vibrations so that the island deck platform 52, including the operator receive little of any effect from a high "g" impact on the ship. However, in the event that a significant shock should occur the chances of the operator being injured by being thrown into any equipment are minimized as the processing equipment 60 is located below the chair 51 in a non-operator contactable position. Shock mounts 67, 68 and counterparts on the opposite side (not shown) are conventional shock mounts. It will be envisioned that with the embodiment of FIGS. 4–6 which allows for remote positioning of the server with only the processor and power supply on the deck platform, the mass of the deck platform 52 and chair 51 can be less than mass of an operator thereby enabling the use of conventional shock mounts as well as enhancing the isolation of the system from shocks.

FIG. 6 shows a perceptive view of a graphic terminal 56 with an integral keyboard 56*a*. The graphic terminal is hingedly mounted by a hinge 59*a* so that in the event of a severe shock the hinge 59 will open allowing the graphic terminal 56 to swing away from the operator as indicated by the arrow. The connecting cable 59 between the graphic terminal and the power equipment is shown extending along arm rest 55*a* and permits the processor and power equipment to be located remotely of the graphics terminal. In order to provide for break-away motion of graphic terminal 56 sufficient slack is included in cable 59 to allow of displacement of graphic terminal 56 without rupturing cable 59. Although a cable is shown connecting graphic terminal 56 to processing equipment, it is envisioned that the processing equipment could communicate with the graphic terminal in a wireless mode. While the graphic terminal is shown mounted to the chair it is envisioned that the graphic terminal could be mounted directly to the platform 52. A further feature of the invention is that chair 51 defines an operator's space for the operator's body so that when the operator is in the operator space the chances of injury are minimized because the operator chair forms a protective barrier between the operator and heavier equipment.

Figure 7:
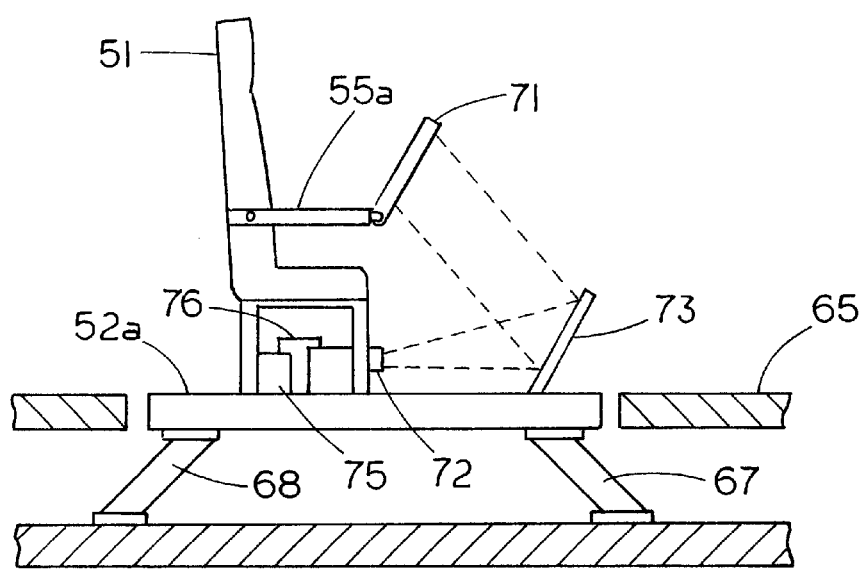
FIG. 7 is a side of the island platform of FIG. 5 with a projector for projecting an image onto a screen in front of the operator.

FIG. 7 shows an alternate embodiment of the invention which is similar to the embodiment shown in FIG. 5 except the graphic terminal 71 comprises a rear projection screen that receives a digital image from a projector such as a digital imager 72 located beneath operator chair 51. Those components in FIG. 7 which are identical to the components in FIG. 5 are provided with identical reference numerals and will not be described herein. A power supply, such as battery 75 connects to digital imager 72 by electrical leads 76 to provide power thereto. Battery 75 could be a backup power supply or a main power supply for the processing equipment and the projector. In the embodiment shown, the digital image 72 projects the image onto a reflector 73, as indicated by dashed lines, that reflects the image to the graphic terminal 71 which is shown as a rear projection screen to enable the operator to view the images. While a digital imager and reflector are used it is envisioned that the digital projector could be positioned in other location so as to direct the image directly onto the graphics terminal 71. In addition, although a digital imager has been described other types of projectors could be used to project the image to the graphics terminal 71. The use of a projection screen as a graphics terminals thus provides an alternate method of providing the necessary graphical image proximate the user while minimizing the presence of processing equipment that might injure an operator during a severe shock to the system.

Figure 8:
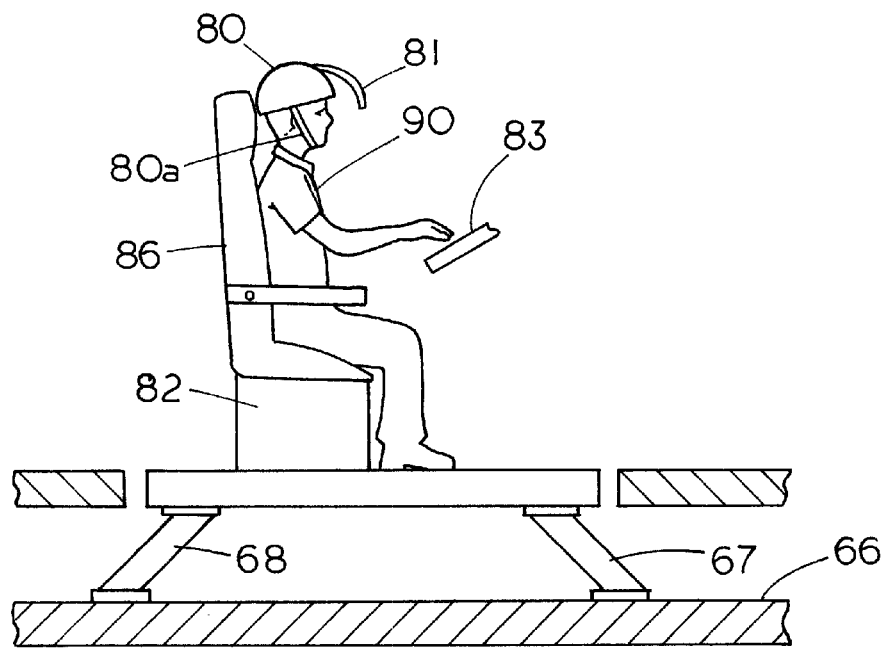
FIG. 8 shows a side view of the island platform of FIG. 5 in use by an operator.

FIG. 8 shows a side view of an island platform of FIG. 5 with an operator 90 using a helmet 80 which can be secured in postion to the operator by a chin strap 80a. Helmet 80 includes an image viewing surface 81 attached to the helmet. The helmet can be hardwired to the processing equipment or a wireless connection can be provided to the helmet 80 to provide the necessary visual images to the operator. If desired, helmet 80 can be a protective helmet that includes padding that would offer further protection to the operator if the operator should be thrown out of the chair 86. The processing equipment 82 is located beneath the operator chair and in an out of the way position. The controls 83 for processing equipment 82 can be handheld and operated similar to remote controls used for televisions and the like. With this type of system substantially all the rigid equipment that could harm the operator has been placed either beneath the operators chair or attached to the operator's body to move with the operator.

We claim:

1. A shock-isolation system for isolation of shocks comprising:
    a support structure;
    a unitary platform, said unitary platform having an operator station thereon;
    a graphics terminal positioned in an operator viewable condition;
    a processing equipment for controlling said graphic terminal;
    an operator station interpositioned between said processing equipment and said graphic terminal to minimize chances of an operator being thrown into said processing equipment; and
    a shock mount for reducing shock and attenuating vibration, said shock mount located between said support structure and said unitary platform, said shock mount for supporting said unitary platform in a condition where the sole support for the unitary platform is the shock mount so that the unitary platform is free to remain spatially fixed to isolate the unitary platform from the effects of high "g" shocks with the operator station and the unitary platform further inhibiting opportunity for operator injury by simultaneously preventing the operator station and the unitary platform from moving relative to one another.

2. The shock-isolation system of claim 1 wherein said graphics terminal is hingedly mounted to swing away to a non operator contacting position in the event of a severe shock to said system.

3. The shock-isolation system of claim 2 wherein the operator station includes a foot deck for an operator.

4. The shock-isolation system of claim 3 wherein the shock-isolation system is only supported by said shock mount.

5. The shock-isolation system of claim 1 wherein the graphics terminal comprises a projection screen and said processing equipment includes a projector for projecting an image onto said graphics terminal.

6. The shock-isolation system of claim 5 wherein the unitary platform is metal and said projection screen is a rear projections screen.

7. The shock-isolation system of claim 6 wherein the unitary platform has a surface area of about 20 to 30 square feet.

8. The shock-isolation system of claim 1 wherein the shock mount provides vibration damping.

9. The shock-isolation system of claim 1 wherein the graphics terminal comprises a helmet securable to an operators head with the helmet including a viewing surface thereon.

10. The shock-isolation system of claim 9 wherein the helmet is a protective helmet to protect the operator from head injuries.

11. The shock-isolation system of claim 9 wherein the processing equipment includes a handheld wireless control.

12. A method of isolating an operator on a structure from injury by an operator's console comprising the steps of:
    supporting a portion of the structure with shock mounts connected to the structure and the portion of the structure to provide shock isolation to the portion of the structure from the structure;
    mounting the operator's graphic terminal to a first portion of an operator station and mounting a processing equipment for the graphic terminal to a second portion of the operators station; and
    interposing an operator chair between the graphic terminal and the processing equipment to minimize operator contact with the processing equipment so that when a shock is transmitted to the structure the portion of the structure and the operator's station are shock isolated as a unit from the structure and the operator chair acts as a physical barrier to minimize injury to an operator by contact with the processing equipment.

13. The method of claim 12 including the step of including vibration dampers in the shock mounts.

14. The method of claim 13 including the step of solely supporting the portion of the structure from the structure with a shock mount.

15. The method of claim 14 including us a chair to defines an operator space so that when the operator is in the operator space the chances of injury are minimized.

16. The method of claim 12 including the step of projecting an image onto the graphic terminal from the processing equipment.

17. The method of claim 16 wherein the step of projecting an image onto the graphic terminal comprises projecting a digital image from a digital projector located below said chair to a reflector to redirect the digital image to the graphic terminal.

* * * * *